United States Patent
Busch et al.

(10) Patent No.: US 6,515,294 B1
(45) Date of Patent: Feb. 4, 2003

(54) DEVICE FOR PRECISION ALIGNMENT OF SHAFTS, ROLLERS, AXLES, SPINDLES OR MACHINE TOOLS

(75) Inventors: Dieter Busch, Ismaning (DE); Roland Hölzl, München (DE); Andreas Unger, Garching (DE); Florian Pfister, München (DE); Michael Hermann, Villingen (DE)

(73) Assignee: Pruftechnik Dieter Busch, AG, Ismaning (DE)

( * ) Notice: Subject to any disclaimer, the term of this patent is extended or adjusted under 35 U.S.C. 154(b) by 0 days.

(21) Appl. No.: 09/520,617

(22) Filed: Mar. 7, 2000

(30) Foreign Application Priority Data

Mar. 9, 1999 (DE) .......................... 199 10 305

(51) Int. Cl.⁷ ...................... G01N 21/86; G01N 21/88; G01V 8/00
(52) U.S. Cl. ..................................... 250/559.3; 356/153
(58) Field of Search ...................... 250/559.3; 356/153

(56) References Cited

U.S. PATENT DOCUMENTS 4,518,855 A * 5/1985 Malak ..................... 356/141.3
4,698,491 A    10/1987 Lysen
5,302,833 A *  4/1994 Hamar et al. ............. 250/559.3

FOREIGN PATENT DOCUMENTS

| DE | 33 35 336  | 4/1984  |
| GB | 2 219 076  | 11/1989 |
| GB | 2 237 380  | 5/1991  |

* cited by examiner

Primary Examiner—Stephone B. Allen
Assistant Examiner—Eric Spears
(74) Attorney, Agent, or Firm—Nixon Peabody LLP; David S. Safran

(57) ABSTRACT

A device for precision measurement of shafts, spindles, or the like calls for two surfaces which are combined with one another, of which one is partially reflecting and the other is roughly fully reflecting. These surfaces reflect an incident light beam independently of one another onto a single optoelectronic target. The target can be read out two-dimensionally and is pixel-oriented. From only a single measurement position, the azimuth and elevation, and the parallel offset between the incident light beam and a center of the reflecting surfaces can be determined.

9 Claims, 4 Drawing Sheets

DEVICE FOR PRECISION ALIGNMENT OF SHAFTS, ROLLERS, AXLES, SPINDLES OR MACHINE TOOLS

BACKGROUND OF THE INVENTION

1. Field of the Invention

The present invention relates to a device for measurement and precision alignment of shafts, rollers, axles or spindles, machine tools and their tools.

2. Description of Related Art

Devices and processes for measurement and for precision alignment of shafts, rollers, axles or spindles, machine tools and their tools have been known for a long time. One of these processes is based, for example, on measuring or aligning the aforementioned articles with respect to a reference plane or another such article with high precision using auto-collimator type devices.

Other processes are based on the teaching given in U.S. Pat. No. 4,698,491.

It is common to the known processes that the devices necessary for their execution are equipped with high-quality optical components, or that, in the production of these devices, special cost-intensive productions steps must be carried out. For this reason, a surprisingly large number of measurement tasks can typically be carried out with these devices.

SUMMARY OF THE INVENTION

The primary object of the present invention is to devise a measurement device with which precision measurements can be carried out with respect to the alignment of two articles, these articles being arranged flush to one another, i.e., having axes of symmetry or lines of symmetry which are parallel to one another. The articles are generally spaced apart from one another, i.e., they have a clear intermediate space of not overly small size.

A further object of the invention is to devise a measurement arrangement, with consideration of the noted spacing situation, which can be prepared especially more economically than was possible in the past, in addition has improved measurement accuracy, and furthermore, is not dependent on taking the measurement in several individual measurement steps or measurement phases, but rather produces measurement results using a single setting; this is considered a quite important advantage.

This object is achieved by measurement means and processes in accordance with the invention which is based on the fact that a photo-optical sender and photo-optical detector are combined with an optical device which, in a combined manner, provides for two reflecting optical elements which act at the same time. In doing so, a first reflective optical element is used in an innovative manner to detect a possibly present angular offset (in azimuth and elevation) between the two indicated articles (for example, axles, especially axles of machine tools), and there is a second reflective optical element to detect a possibly present parallel or lateral offset between the two indicated articles. (The parallel or lateral offset can also be detected in two coordinates which are perpendicular to one another). The two reflectively acting optical elements are oriented, fixed, and spaced relative to one another. In one especially simple embodiment of the invention, the use of lenses can be eliminated. The invention is, furthermore, based on the fact that the photosensitive flat detector is a flat CCD or CMOS array which has outstanding geometrical-optical properties from the start. This capacity to be able to detect more or less simultaneously several light spots on its surface, and at the same time, to deliver information about their intensity is used advantageously for one preferred embodiment of the invention.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
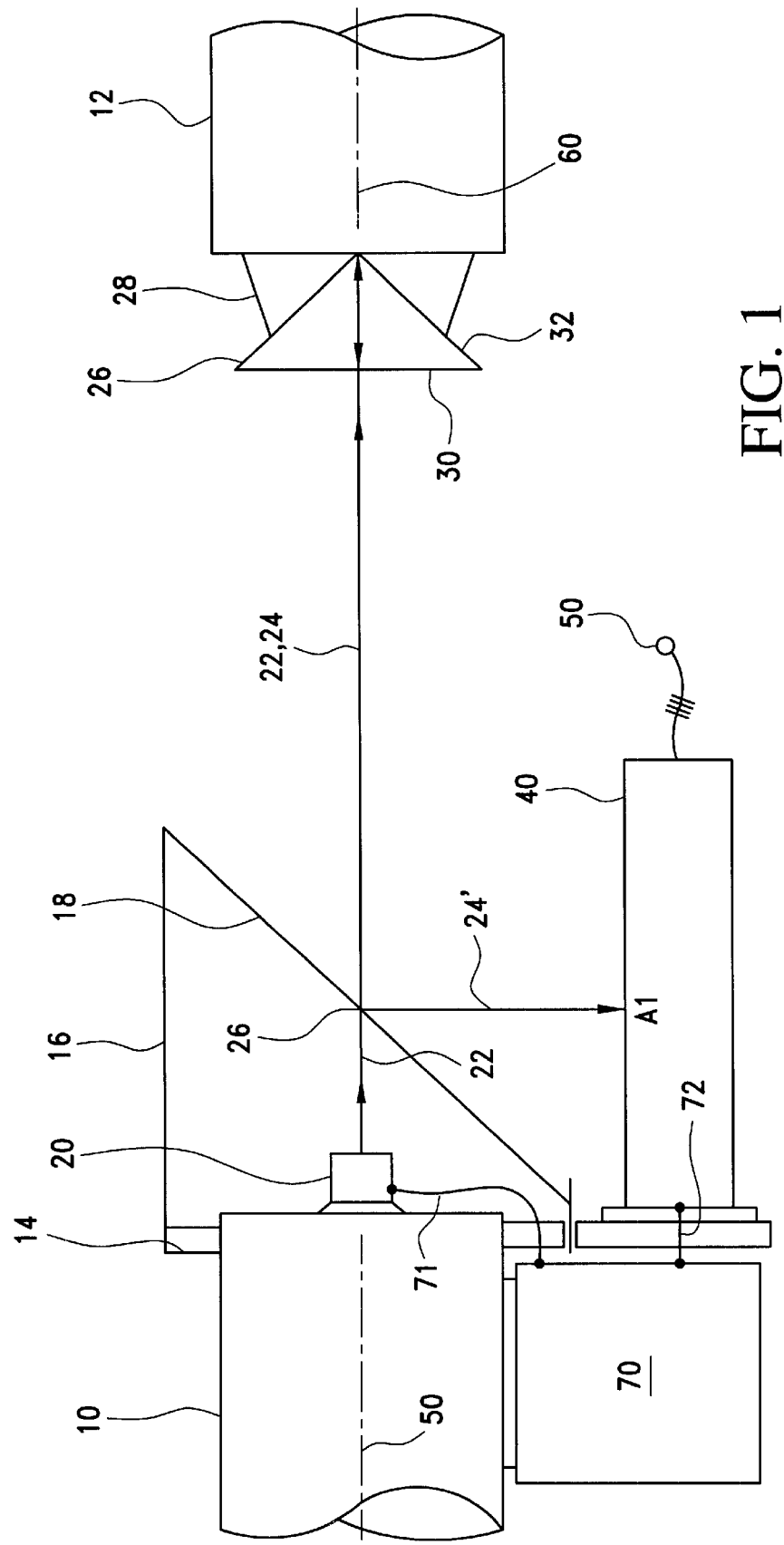
FIG. 1 is cross-sectional view of a device in accordance with the invention showing the beam path for perfectly aligned machines or articles.

The shaft 10 which is shown in FIG. 1 is typically of round cross section and high precision. It is preferably placed against predefined contact surfaces of machines or articles, and can be clamped especially in collet chucks or tool holders of machine tools. A light-emitting device 20, for example, a semiconductor laser, is attached to the end face of the shaft 10; with the laser a narrow and preferably parallel light beam can be produced with a main direction of propagation which coincides with the axis 50 of the shaft 10. Instead of the laser, a light emitting diode together with a focusing means can be used, or also other light-emitting means which deliver noncoherent, especially multicolor light. The light-emitting device 20 is thus preferably attached such that the center of its emission aperture comes to lie on the axis 50. A suitable conventional power supply 70 of the device 20 is provided which contains, for example, a battery and is connected to the device 20 by means of a multi-wire electrical cable 71.

A holder 14 or beveled barrel 16 is used to support a partially reflecting mirror 18 in a fixed orientation and spacing relative to the light-emitting device 20. The partial reflectivity can be, for example, 50%. Likewise, a flat opto-electronic sensor or element 40 is fixed to the device; the sensor or element is supplied with power by means of a cable 72 and has a signal output 50, as is known according to the prior art, and uses at least two conductors.

A light beam 22 which is emitted by the light-emitting device 20 distally traverses the aforementioned clear intermediate space between the shaft 10 and the shaft 12 or the measurement components attached thereto. It is shown in FIG. 1 how this light beam 22 passes through a partially-reflecting, planar front surface 30 of a triple mirror or triple prism 32 (acting as a retro-reflector), which front surface can have a reflectivity from 5% to 70%. The triple prism (shown in FIGS. 1 to 3 in simplified form), in the conventional manner, has two reflecting surfaces which are perpendicular to one another, of which one is identified, for example, with reference number 26. Light beams entering the triple prism 30 are reflected with an axial offset, but are parallelly aligned. The example shown illustrates a light beam 24 which is reflected parallel and coincidently, in the case of shafts 10 and 12 which are exactly aligned relative to one another. This light beam 24 is reflected on the partially-mirrored planar reflector 18 and is incident as a light beam 24' on a point A1 of the flat opto-electronic element 40 which is hereinafter referred to as the detector. The impingement point A1 can be determined using two linear coordinates which define the photosensitive plane of the detector 40. The impingement point A1 therefore defines an ideal position which appears when the shafts 10 are exactly aligned and which can be recorded with conventional electronics. However, for this purpose, it is necessary for the triple prism 32 to be attached precisely by means of suitable and stable holding devices 28 on the shaft 12 so that a line perpendicular to the surface 30 runs parallel to the axis (also called the core) 60 of the shaft 12. Similar to the shaft 10, the shaft 12 is also preferably of round cross section and can be clamped, according to one preferred application of the invention, in collet chucks or a tool holder of a machine tool; this is not shown in detail here. As is shown in FIG. 1, the axis 60 punctures the tip of the triple prism 32. In one modified embodiment of the invention, there is a defined offset of this tip relative to the axis 60, which axis, however, is to be oriented perpendicular to the surface 30. The reason for this symmetrical arrangement becomes apparent from the following explanations.

Figure 2:
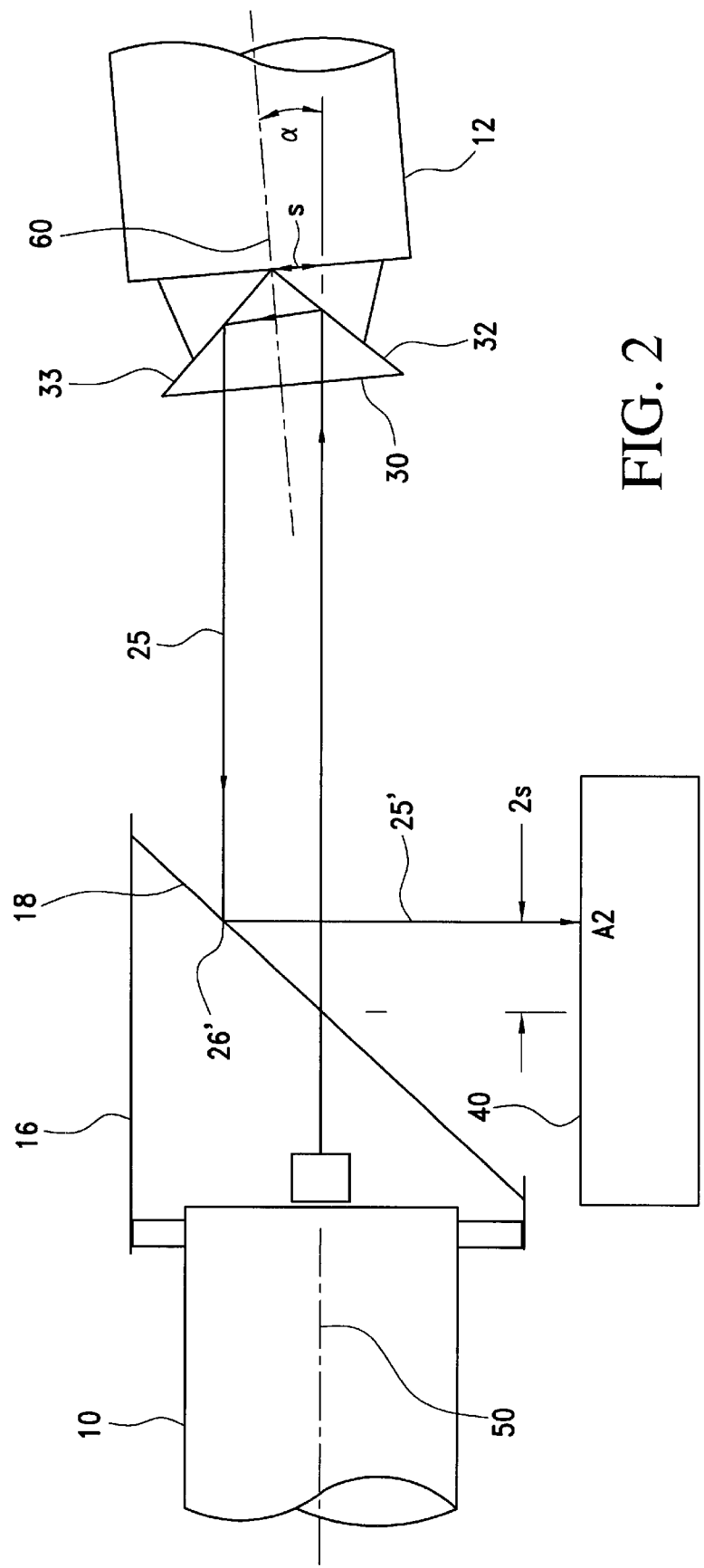
FIG. 2 view corresponding to that of FIG. 1, but showing a beam path for machines or articles which are misaligned angularly and linearly/translationally.

In FIG. 2, some of the conditions are shown which arise in a shaft 12 which is offset angularly (angle alpha) and laterally (displacement "s") relative to the shaft 10, specifically the beam path of an emitted light beam 30 which is reflected repeatedly on the fully mirrored reflecting side surfaces (for example, 33) of the triple mirror 32 and then leaves the mirror 32, with a parallel offset, as the light beam 25. (FIG. 2 is drawn with great vertical exaggeration in terms of angle for reasons of illustration). The light beam 25 is deflected at the point 26' by the partially mirrored flat reflector 18 in the direction of the detector 40 and is incident there on point A2. As drawn, this point is spaced away from the impingement point A1 by an amount 2s in the direction of the emitted light beam 30. As is recognized, for the beam path which is shown in FIG. 2, the angular offset of the shaft 12, first of all, does not play any role, only the lateral offset "s" leads to displacement of the beam 25 which is reflecting from the aforementioned reflecting surfaces.

Figure 3:
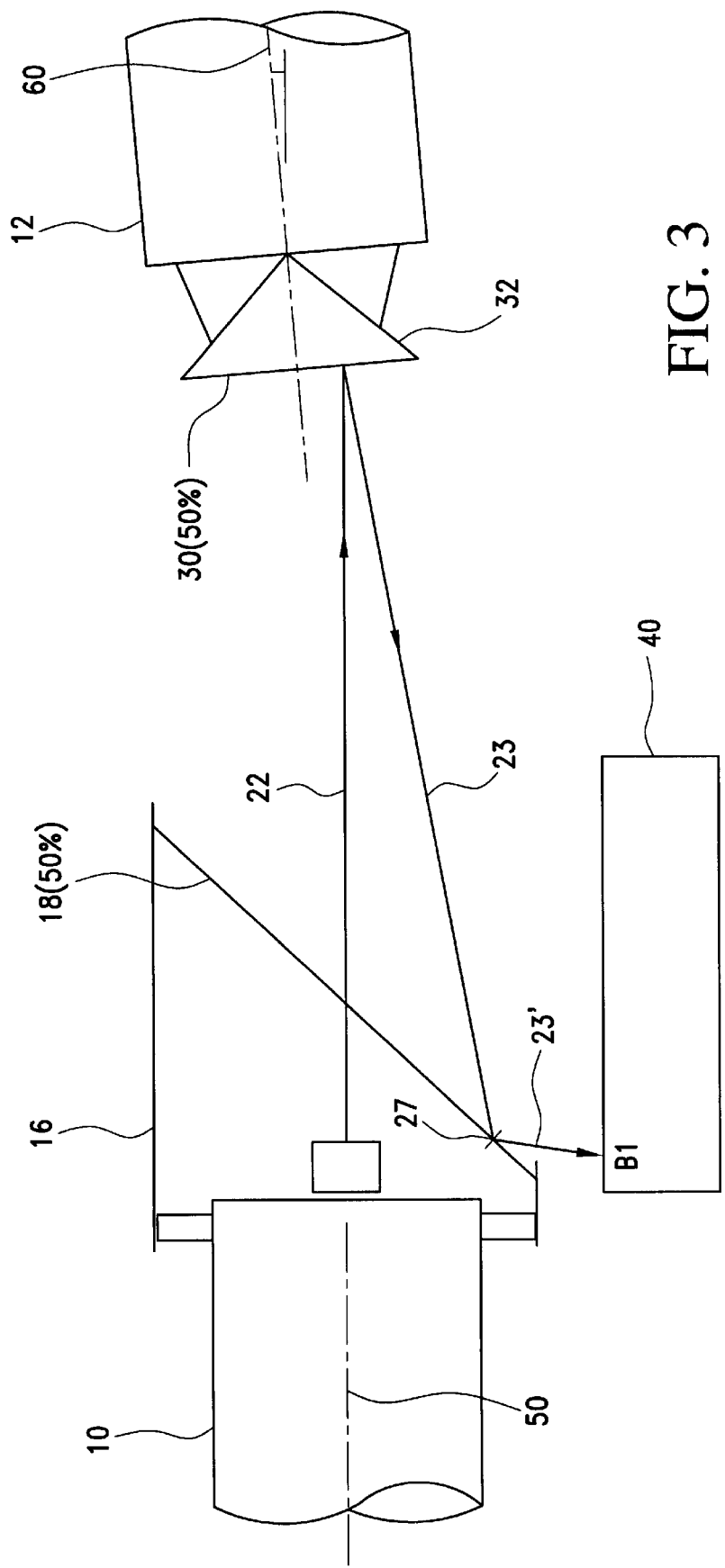
FIG. 3 is cross-sectional view similar to that of FIGS. 1 & 2, but showing a beam path outside of the triple prism which otherwise acts as a retro-reflector.

As is shown in FIG. 3, the decisive feature of the invention is the simultaneous use of an additional reflector, specifically in the form of a partially reflecting front surface 30 of the triple prism 32. In this way, a set portion, which can be, for example, 50% of the intensity of the beam 22, is reflected directly as a beam 23 onto the reflector 18, where it is incident on point 27 and from there, as the beam 23', it is reflected to the impingement point B1 on the detector 40. With the indicated 50% mirroring of the surface 30, the beam 23 is therefore much more intense than beams 24 and 25 which are subjected to additional attenuation process as a result of passing twice through the surface 30. Thus, the point of light to be recorded at point B1 differs clearly from those which are to be recorded at A2. Since it is advantageous to be able to distinguish points A2 and B1 from one another, in any case, which is not the case for the point A1 (FIG. 1), as already mentioned, it is advantageous to mount the triple prism 32 with an axial offset relative to the axis 60. In this way, it is distinguished between those beams which have been influenced by a first reflecting element and those beams which have been influenced by a second reflecting optical element. The following is important here: The direction of the beams which are shown in FIG. 3 and which were reflected by the surface 30 is essentially dependent only on the angular offset between the axes 50 and 60 (measured by two coordinates, i.e., azimuth and elevation). The lateral offset of the axis 60 relative to the axis 50 essentially no longer has any effect on the beam path for the beam 23 and can, if necessary, be taken into account by a correction calculation. This makes it possible to determine the angle coordinates of the angular offset between the shafts 50 and 60 by means of the two coordinates of the point B1 on the photosensitive plane of the detector 40.

Therefore, electronics downstream of the detector need simply ascertain by which coordinates the point B1 is defined and by which coordinates the point A2, for example, is defined. Using these data, in further computation steps which are executed by an appropriate computer (not shown), a possible faulty offset between the shafts 10 and 12 can be determined. Using these results, a correction measure can thus be carried out which is designed to make the axes 50 and 60 coincident.

If the accuracy of the analysis is to be increased with respect to a minor faulty offset, it is possible in accordance with the invention to obtain a set of measurement results and to evaluate them accordingly by determining one measurement result for various rotational positions of the shaft 10. Instead of an individual point A2 or B1, thus lines are defined with characterizing parameters (for example, center of inertia, middle point, scattering, etc) which are to be used to compute ideal values for these points which then are sent to another computation pass so that refined measured values are available for possible correction undertakings on the shafts.

In a comparable manner, an improved result can be made available by turning only the shaft 12, together with the mounted reflecting elements, with the shaft 10 fixed, and likewise, by determining individual measured values for a certain number of rotary positions.

In a comparable manner, an improved result of the measurement can be prepared by shafts 10 and 12 being turned synchronously and the positions of the impingement points A2, B1 determined, recorded and evaluated for a number of rotary positions.

In another embodiment of the invention, instead of the flat reflecting surfaces of the triple mirror, a curved, especially spherical shape, can be used; however, this makes analysis of the identified impingement points A2, B1 much more difficult and complex. For example, the triple prism 32 can be replaced by a partially mirrored and fully mirrored plano-convex lens which can be produced more economically than the triple prism.

Figure 4:
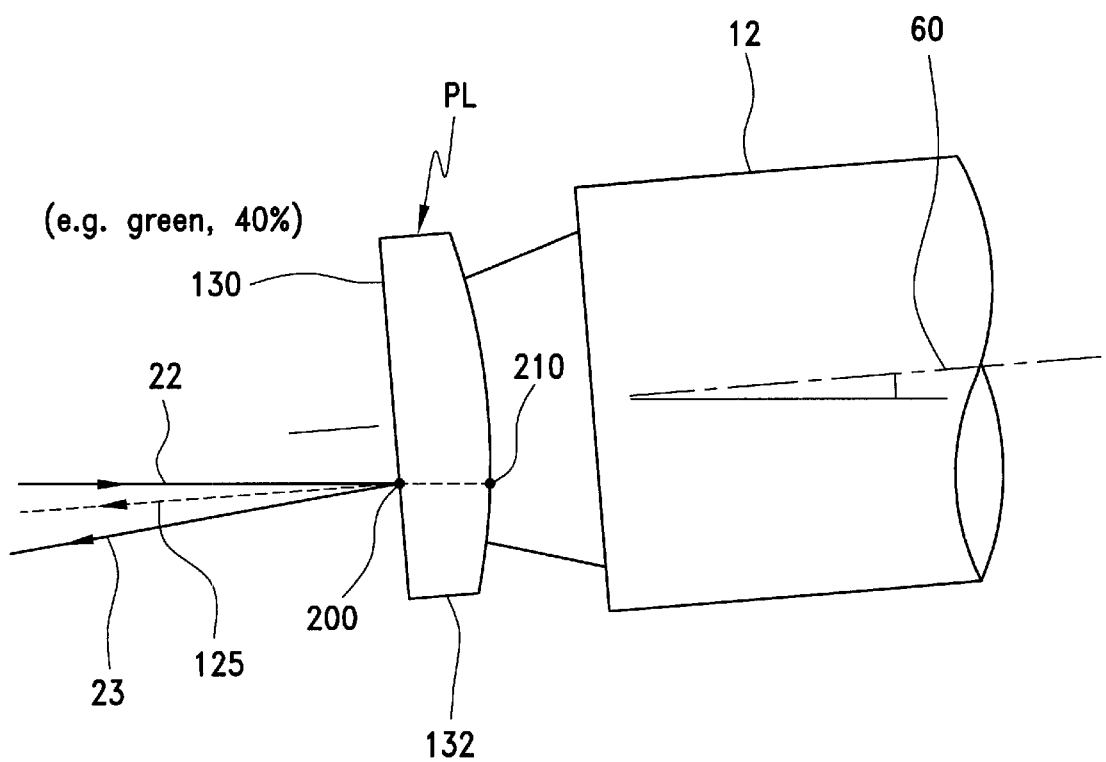
FIG. 4 shows modified embodiment in which the triple prism is replaced by a plano-convex lens which is fully mirrored on the back and partially mirrored on the front.

This is shown in FIG. 4. The plano-convex lens PL, which is fully mirrored on the back and which is partially mirrored on the front, is attached to the shaft 12. For example, the partially reflecting layer 130 is roughly 40% reflective. Most of the light reflected there is in the green spectral range. An incident light beam 22 is proportionally reflected at point 200, for example, with essentially green color, as a beam 23, according to the angular orientation of the shaft 12. The unreflected light reaches the impingement point 210 from where it is reflected as the light beam 125 with the corresponding remaining spectral components in order to emerge again from the lens in the vicinity of the partially mirroring layer 130. The remaining details correspond to those of FIG. 3.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Device for alignment of coupled rotary bodies relative to one another, comprising a light emitting means for producing a light beam, said light emitting means being attached, essentially centered, on an end face of a first rotary body, a single flat photosensitive element which is adapted for measuring light points which are imaged onto it according to two linear coordinates and according to intensity, flat photosensitive element being spaced at a fixed distance with reference to the light emitting means, a first and a second reflecting optical element, said optical elements being attached to a second rotary body, the second rotary body being spaced distally from the first rotary body and the two reflecting optical elements having a fixed spacial relationship with respect to one another and with respect to the second rotary body; wherein the first reflecting optical element, according to an angular offset between the first and second rotary bodies, reflects a light beam generated by the light emitting means in a first predefined manner onto the flat photosensitive element, and the second reflecting optical element, according to a lateral offset between the indicated first and second rotary bodies, reflecting the same light beam generated by the light emitting means in a second predefined manner onto the flat photosensitive element.

2. Device for alignment of coupled rotary bodies according to claim 1, wherein said first and second rotary bodies are shafts.

3. Device for alignment of coupled rotary bodies according to claim 1, wherein said first and second reflective elements are surfaces of a triple prism.

4. Device for alignment of coupled rotary bodies according to claim 1, wherein said first and second reflective elements are surfaces of plano-convex lens.

5. Device for alignment of coupled rotary bodies according to claim 1, wherein one of said first and second reflective elements is partially reflective and the other is essentially fully reflective.

6. Device for alignment of coupled rotary bodies according to claim 5, wherein said first and second reflective elements are surfaces of a triple prism.

7. Device for alignment of coupled rotary bodies according to claim 5, wherein said first and second reflective elements are surfaces of plano-convex lens.

8. Device for alignment of coupled first and second rotary bodies relative to each other comprising:
   a light emitting means for producing a light beam, said light emitting means being centrally attached on an end face of the first rotary body,
   a single flat photosensitive element adapted for measuring the intensity of light points which are imaged onto the photosensitive element according to two linear coordinates wherein the flat photosensitive element is spaced a fixed distance from the light emitting means, and
   an optical element having first and second reflecting surfaces, wherein the optical element is attached to the second rotary body which is spaced distally from the first rotary body and wherein the first and second reflecting surfaces have a fixed spacial relationship with respect to one another and with respect to the second rotary body such that the first reflecting surface is positioned perpendicular to a rotary axis of the second rotary body,
   wherein the first reflecting surface, according to an axial angular offset between the first and second rotary bodies, reflects the light beam generated by the light emitting means in a first predefined manner onto the flat photosensitive element, and the second reflecting surface, according to a lateral offset between the indicated first and second rotary bodies, reflects the same light beam generated by the light emitting means in a second predefined manner onto the flat photosensitive element.

9. Device for alignment of coupled first and second rotary bodies according to claim 8, wherein the first reflecting surface also transmits a portion of the light from the light beam onto the second reflecting surface.

* * * * *